United States Patent [19]

Gaku et al.

[11] 4,393,195

[45] Jul. 12, 1983

[54] CURABLE CYANATE ESTER/ACRYLIC EPOXY ESTER COMPOSITION

[75] Inventors: Morio Gaku, Showamachi; Nobuyuki Ikeguchi, Tokyo; Satoshi Ayano, Ninomiya, all of Japan

[73] Assignee: Mitsubishi Gas Chemical Company, Inc., Tokyo, Japan

[21] Appl. No.: 175,510

[22] Filed: Aug. 5, 1980

[30] Foreign Application Priority Data

Aug. 8, 1979 [JP] Japan ............................ 54-100929

[51] Int. Cl.$^3$ .................... C08G 83/00; C08G 73/12
[52] U.S. Cl. .................................... 528/361; 525/187; 525/205; 525/230; 525/422; 528/86; 528/117; 528/119; 528/170; 528/172; 528/211; 528/248; 528/253; 528/322; 528/363
[58] Field of Search ............... 528/361, 363, 322, 117, 528/119, 86, 170, 172, 211, 248, 253; 525/422, 187, 205, 230

[56] References Cited

U.S. PATENT DOCUMENTS

| | | | |
|---|---|---|---|
| 3,448,079 | 6/1969 | Grigat et al. | 260/59 |
| 3,553,244 | 1/1971 | Grigat et al. | 260/453 |
| 3,562,214 | 2/1971 | Kubens et al. | 260/47 |
| 3,740,348 | 6/1978 | Grigat et al. | 260/453 AL |
| 3,755,402 | 8/1973 | Grigat et al. | 260/453 AR |
| 4,022,755 | 5/1977 | Tanigaichi et al. | 260/59 R |
| 4,026,913 | 5/1977 | Tanigaichi et al. | 260/463 |
| 4,110,364 | 8/1978 | Gaku et al. | 528/170 |
| 4,116,946 | 9/1978 | Jakob et al. | 528/361 |
| 4,142,034 | 2/1979 | Schroll | 528/361 |
| 4,330,669 | 5/1982 | Ikeguchi et al. | 528/322 |

FOREIGN PATENT DOCUMENTS

1060933 3/1967 United Kingdom .

*Primary Examiner*—Harold D. Anderson
*Attorney, Agent, or Firm*—Fleit, Jacobson & Cohn

[57] ABSTRACT

A curable resin composition comprising a mixture and/or a preliminary reaction product of (a) polyfunctional cyanate ester, prepolymer of the cyanate ester, or coprepolymer of the cyanate ester and an amine, and (b) acrylic epoxy esters, methacrylic epoxy esters, prepolymers of acrylic epoxy esters, prepolymers methacrylic epoxy esters, coprepolymers of acrylic epoxy esters and methacrylic epoxy esters and mixtures thereof, and a curable resin composition comprising a mixture or a preliminary reaction product of above component (a), above component (b) and (c) a polyfunctional maleimide, prepolymer of the maleimide or coprepolymer of the maleimide and an amine are disclosed. Cured resin having excellent impact-resistance, adhesive power, heat-resistance and chemical resistance can be prepared from the compositions.

8 Claims, No Drawings

CURABLE CYANATE ESTER/ACRYLIC EPOXY ESTER COMPOSITION

BACKGROUND OF THE INVENTION

This invention relates to a curable resin composition comprising a mixture and/or a preliminary reaction product of (a) a polyfunctional cyanate ester, prepolymer of the cyanate ester or coprepolymer of the cyanate ester and an amine (sometimes hereinunder referred to as component (a)), and (b) at least one compound selected from the group consisting of acrylic epoxy esters, methacrylic epoxy esters, prepolymers of acrylic epoxy esters, prepolymers of methacrylic epoxy esters, coprepolymers of acrylic epoxy esters and methacrylic epoxy esters and mixtures thereof (sometimes hereinunder referred to as component (b)) and also relates to a curable resin composition comprising a mixture and/or a preliminary reaction product of (a) a polyfunctional cyanate ester, prepolymer of the cyanate ester or coprepolymer of the cyanate ester and an amine, (b) at least one compound selected from the group consisting of acrylic epoxy esters, methacrylic epoxy esters, prepolymers of acrylic epoxy esters, prepolymers of methacrylic epoxy esters, coprepolymers of acrylic epoxy esters and methacrylic epoxy esters and mixtures thereof, and (c) a polyfunctional maleimide, prepolymer of the maleimide or coprepolymer of the maleimide and an amine (sometimes hereinunder referred to as component (c)). Cured resin obtained by curing each of the resin compositions has excellent impact-resistance, adhesive power, heat-resistance and chemical resistance.

In the prior art, the cured resin obtained by cast-molding a composition containing a polyfunctional maleimide and a polyfunctional cyanate ester has low impact resistance. Similarly, the cured resin obtained by cast-molding cyclopentadiene resin is fragile.

SUMMARY OF THE INVENTION

The present inventors carried out research for obtaining a cured resin having excellent impact resistance and excellent adherence to the substrate. As a result it was found that when a curable resin composition comprising a mixture and/or a preliminary reaction product of (a) a polyfunctional cyanate ester, prepolymer of the cyanate ester or coprepolymer of the cyanate ester and an amine, and an acrylic epoxy ester or its prepolymer, a methacrylic epoxy ester or its prepolymer, or coprepolymer of the acrylic epoxy ester and the methacrylic epoxy ester, or a curable resin composition comprising a mixture and/or a preliminary reaction product of above component (a), above component (b) and component (c) a polyfunctional maleimide, prepolymer of the maleimide or coprepolymer of the maleimide and an amine is cured, a cured resin having the above mentioned desirable properties can be obtained. This invention is based on this discovery.

DETAILED DESCRIPTION OF THE INVENTION

By polyfunctional cyanate ester is meant a compound having at least two cyanate groups in its molecule. The polyfunctional cyanate ester is represented by the formula

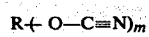

wherein R is an aromatic nucleus-containing residue which is selected from the group consisting of a residue derived from an aromatic hydrocarbon selected from the group consisting of benzene, biphenyl and naphthalene, a residue derived from a compound in which at least two benzene rings are bonded to each other by a bridging member selected from the group consisting of

wherein $R^1$ and $R^2$ are the same or different and each represents a hydrogen atom or an alkyl group containing 1 to 4 carbon atoms,

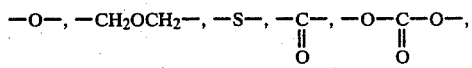

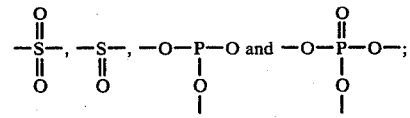

said aromatic nucleus is optionally substituted by a substituent selected from the group consisting of alkyl groups containing 1 to 4 carbon atoms, alkoxy groups containing 1 to 4 carbon atoms, chlorine and bromine; m is an integer of 2 to 5, and the cyanate group is always directly bonded to the aromatic nucleus.

Examples of the polyfunctional cyanate ester include dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane; 2,2-bis(4-cyanatophenyl)propane, 2,2-bis(3,5-dichloro-4-cyanatophenyl)propane, 2,2-bis(3,5-diblomo-4-dicyanatophenyl)propane; bis(4-cyanatophenyl)ether; bis(4-cyanatophenyl)thioether; bis(4-cyanatophenyl)sulfone; tris(4-cyanatophenyl)phosphite; tris(4-cyanatophenyl)phosphate; bis(3-chloro-4-cyanatophenyl)methane; cyanated novolak derived from novolak cyanated disphenol type polycarbonate oligomer derived from bisphenol type polycarbonate oligomer and mixture thereof. Other cyanate esters employed in the practice of this invention are given in Japanese Patent Publication Nos. 1928/1966, 4791/1969, 11712/1970 and 41112/1971 and Japanese Patent Publication (laid open) No. 63129/1976 which are incorporated herein for references. The above mentioned cyanate esters may be used as mixtures.

Prepolymers may be used containing a sym-triazine ring which is prepared by the trimerization of the cyanate groups of the cyanate ester, and which have an average molecular weight of at least 400 but no more than 6,000. Such prepolymers can be prepared by polymerizing the above cyanate esters in the presence of, as a catalyst, an acid such as a mineral acid or Lewis acid, a base such as sodium hydroxide, a sodium alcoholate or a tertiary amine, or a salt such as sodium carbonate or lithium chloride.

The polyfunctional cyanate ester can be used in the form of a mixture of the monomer and the prepolymer. For example, many of the commercially available cyanate esters derived from bisphenol A and cyanogen halide are in the form of mixtures of cyanate monomers and prepolymers, and such materials can also be used in the present invention.

A coprepolymer of the cyanate ester and an amine may be used as the cyanate ester component. Examples of the amines include meta- or para-phenylenediamine, meta- or para-xylylenediamine, 1,4- or 1,3-cyclohexanediamine, hexahydroxylylenediamine, 4,4'-diaminobiphenyl, bis(4-aminophenyl)methane, bis(4-aminophenyl)ether, bis(4-aminophenyl)sulfone, bis(4-amino-3-methylphenyl)methane, bis(3-chloro-4-aminophenyl) methane, bis(4-amino-3,5-dimethylphenyl)methane, bis(4-aminophenyl)cyclohexane, 2,2-(4-aminophenyl)propane, 2,2-bis(4-amino-3-methylphenyl)propane, 2,2-bis(3,5-dibromo-4-aminophenyl)propane, bis(4-aminophenyl)phenylmethane, 3,4-diaminophenyl-4'-aminophenylmethane and 1,1-bis(4-aminophenyl)-1-phenylethane.

A mixture of prepolymer of the cyanate ester and coprepolymer of the cyanate ester and an amine may be used as component (a) of this invention.

The acrylic epoxy ester of methacrylic epoxy ester is represented by the formula

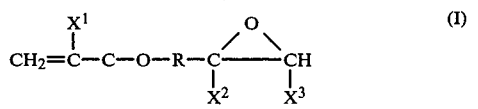

wherein $X^1$ is hydrogen or methyl; each of $X^2$ and $X^3$ is hydrogen, methyl or ethyl, or when taken together $X^2$ and $X^3$ represent alkylene having 3–5 carbon atoms; R is hydrocarbon or substituted hydrocarbon having 1–16 carbon atoms. Profitably R group in the compound represented by the above formula (I) may be —$CH_2$—, —$CH=CH$—, —$CH_2CH(CH_3)$—, —$(CH_2)_4$—$CH(CH_3)$—, —$(CH_2)_6$—$CH(CH_3)$—, —$(CH_2)_{10}$—$CH(CH_3)$—,

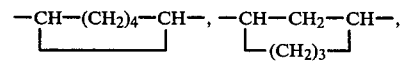

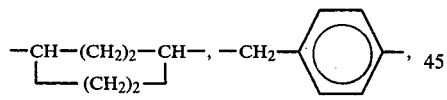

and —$(CHY^1CHY^2O)_p$— wherein both of $Y^1$ and $Y^2$ are hydrogen, or one of them is hydrogen and the other is methyl, and p is integer of 1–7. The acrylic epoxy ester or methacrylic epoxy ester may be prepolymerized by means of an organic peroxide, an ionic polymerization catalyst, heat or ultraviolet radiation. A prepolymer of the acrylic epoxy ester or the methacrylic epoxy ester or coprepolymer of the acrylic epoxy ester and the methacrylic epoxy ester may be used as component (b).

The ratio of component (a) and component (b) is not critical. The ratio by weight of component (a) to component (b) may be in the range of from 99:1 to 1:99, preferably from 95:5 to 35:65. For example, when it is necessary for a cured resin to have heat resistance, more component (a) is used than component (b).

When component (c) is used with components (a) and (b), the heat resistance of the cured resin is further improved.

The polyfunctional maleimides employed in the present invention are organic compounds having two or more maleimide groups derived from maleic anhydride and a polyamine and are represented by the following general formula

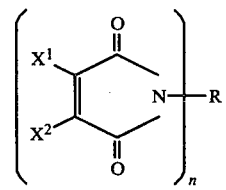

wherein R represents divalent to pentavalent aromatic or alicyclic organic group, each of $X^1$ and $X^2$ represent a hydrogen atom, halogen atom or alkyl group, and n represent integer of 2-5.

The maleimides represented by the above formula can be produced by a method known per se which involves reacting maleic anhydride with polyamine to form a maleamide acid, and then dehydro-cyclizing the maleamide acid.

Aromatic amines are preferable as the starting polyamines. The reason is that the resulting object resin has excellent properties, such as heat-resistance, etc. When the resulting object resins have desirable flexibility and pliability, alicyclic amine alone or combination of the alicyclic amines and other amines may be used. Though secondary amines can be used as the starting amine, the primary amines are preferable.

Amines employed in reaction with cyanate esters for preparing coprepolymers of the cyanate ester and the amine may be profitably used as an amine component for preparing maleimides. In addition to the above mentioned amines, melamine having s-triazine ring and polyamines obtained by reaction aniline with formaldehyde, in which two or more benzene rings are bonded through methylene bond, may also be used.

The functional maleimides as mentioned above may be used alone or as a mixture. Also the prepolymer of the maleimide obtained by heating the maleimide in the presence or absence of a catalyst may be used. In addition, coprepolymers of the maleimide and the amine employed for synthesizing the polyfunctional maleimide may be used.

The curable composition of this invention may be prepared by merely mixing the above mentioned components (a) and (b) or components (a), (b) and (c) or by using the product of preliminary reaction of these components.

The curable composition of this invention comprises a mixture and/or a preliminary reaction product of (a) at least one compound selected from the group consisting of polyfunctional cyanate esters, prepolymers of the cyanates esters or coprepolymers of the cyanate esters and an amine and (b) at least one compound selected from the group consisting of acrylic epoxy esters, methacrylic epoxy esters, prepolymers of acrylic epoxy esters, prepolymers of methacrylic epoxy esters, coprepolymers of acrylic epoxy esters and methacrylic epoxy esters and mixtures thereof and optionally (c) at least one compound selected from the group consisting of polyfunctional maleimides, prepolymers of the maleimides and coprepolymers of the maleimides and an amine and/or (d) other component. The composition may be a mixture of components (a) and (b) and optionally (c) and/or (d); a preliminary reaction product of components (a) and (b), components (a), (b) and (c) or components (a), (b), (c) and (d); a mixture of preliminary reaction product of two or three of components (a), (b), (c) and (d) and the remainder thereof. Other components (d) include epoxy resins; (meth)acrylates, such as methacrylates, acrylates, acrylic alkenyl esters, methacrylic alkenyl esters, its prepolymers; polyallyl compounds, such as diallyl phthalate, divinylbenzene, diallylbenzene, trialkenyl isocyanurates or its prepolymers; phenol resins; polyvinyl acetal resins, such as polyvinyl formal, polyvinyl acetal, or polyvinyl butyral; acrylic resins, silicone resins, or alkyd resins having OH group or COOH group; and liquid or elastic rubbers, such as polybutadiene, butadieneacrylonitrile copolymer, polychloroprene, butadiene-styrene copolymer, polyisoprene or natural rubbers.

The curable composition of this invention may be reticulated by heating it alone to form a cured resin having heat resistance. In general, a catalyst may be used in order to promote crosslinking reaction of the components in the composition.

Examples of the catalysts include imidazoles, such as 2-methylimidazole, 2-undecylimidazole, 2-heptadecyl imidazole, 2-phenylimidazole, 2-ethyl 4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethylaniline, 2-N-ethylanilino ethanol, tri-n-butylamine, pyridine, quinoline, N-methylmorpholine, triethanolamine, triethylenediamine, N,N,N'N'-tetramethylbutanediamine, N-methylpiperidine; phenols, such as phenol, cresol, xylenol, resorcine, and phloroglucin; organic metal salts, such as lead naphthenate, lead stearate, zinc octoate, zinc octylate, tin oleate, dibutyl tin maleate, manganese naphthenate, cobalt naphthenate, and acetyl aceton iron; and inorganic metal salts, such as stannic chloride, zinc chloride and aluminum chloride; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, lauric anhydride, pyromellitic anhydride, trimellitic anhydride, hexahydrophthalic anhydride; hexahydropyromellitic anhydride and hexahydrotrimellitic anhydride, azo compounds, such as azoisobutylonitrile, 2,2'-azobispropane, m,m'-azoxystyrene, hydrozones, and mixtures thereof.

In addition to the above mentioned catalysts, a curing agent for epoxy resin and a curing catalyst for epoxy resin may be used as a catalyst of this invention.

The amount of the catalyst employed may be less than 5% by weight of total composition.

A variety of additives may be added to the curable composition to impart specific properties provided that they do not impair the essential properties of the resulting resin. Examples of the additives include natural or synthetic resins, fibrous reinforcements, fillers, pigments, dyestuffs, thickening agents, lubricants, flame-retardants and the like.

The curable compositions of this invention are present in a wide range of forms from liquid to solid at room temperature, depending on the natures of the components constituting the composition, and the preliminary reaction conditions. Solid curable composition, liquid curable composition or solution of the composition in solvent may be used according to the use purpose.

The curing conditions of the curable composition of this invention depend on the proportions of components constituting the composition and the nature of the components employed. In general, the composition of this invention may be cured by heating it at a temperature within the range of 100°–250° C.

When the curable composition of this invention is used for preparing molding, laminate, adhesive-assembly, press means is preferably applied to the molding, laminate or adhesive-assembly in the heat curing step. In general, these products may be pressed at a superpressure of 10–500 Kg/cm$^2$.

The composition of this invention is rapidly curable and is cured even under mild conditions, so is especially suitable when quantity production and ease of workability are desired. The cured resin made from the composition not only has excellent adhesive force, bond strength, heat resistance, and electric properties, but also is excellent in mechanical properties, such as impact resistance, chemical resistance, moisture resistance and the like. The composition of this invention has a variety of uses: as a coating material for rust prevention, flame resistance, flame retardance and the like; as electrical insulating varnish; as adhesive; in laminates to be used for furniture, building materials, sheathing materials, electrical insulating materials, and the like; and in a variety of moldings.

The present invention is further illustrated by the following non-limiting Examples and Comparative Examples. Percent and parts are by weight, unless otherwise specified.

EXAMPLE 1

350 g (grams) Of glycidyl methacrylate was dissolved in 650 g of acetone. To the mixture was added 0.5 g of benzoyl peroxide as a polymerization catalyst. Polymerization was effected for 4 hours while refluxing acetone. Thereafter, 303 g of acetone was removed from the system through distillation. The remainder was dropped in a large amount of methanol to obtain polymer. The polymer was dried at 350° C. under 2 mm Hg for 8 hours. 200 g Of the polymer was mixed with 600 g of prepolymer obtained by preliminarily reacting 2,2-bis(4-cyanatophenyl)propane at 160° C. for 3 hours. To the mixture were added 0.2 g of zinc octoate and 0.2 g of triethylene as a catalytic composite, 2 g of carbon black and 1500 g of wollastonite. The resulting mixture was uniformly milled to form molding material. The molding material was molded at 30 Kg/cm$^2$ at 150° C. for 100 minutes. The resulting molded product was cured at 200° C. for 24 hours. The test results on the product are shown in Table 1.

Control Test 1

The procedure of Example 1 was repeated except that glycidyl methacrylate was not used, thereby obtaining molded product. The test results on the product are shown in Table 1.

TABLE 1

|  | Example 1 | Control Test 1 |
|---|---|---|
| Heat distortion temperature | more than 200° C. | more than 200° C. |
| product has surface gloss | yes | no |
| product is adversely effected, when maintained | no | somewhat |

TABLE 1-continued

|  | Example 1 | Control Test 1 |
|---|---|---|
| at 120° C. at 2 atms, in steam for 24 hours. | | |

EXAMPLE 2

400 g Of glycidyl methacrylate prepolymer prepared in the same way as in Example 1 was mixed with preopolymer obtained by preliminarily reacting 900 g of 1,4-dicyanatobenzene with 100 g of bis(4-maleimidophenyl)ether at 150° C. for 4 hours.

To the mixture were added 0.5 g of zinc octoate (catalyst) and 1500 g of wollastonite (filler). The mixture was uniformly milled and then pulverized to obtain powder coating material. The powder was coated on an iron surface through the fluidization dip coating method. The coating was melted 150° C. and was baked for 70 minutes to obtain a uniform coating. The coating was cured at 180° C. for 5 hours. The coating had good surface gloss and uniform thickness.

Control Test 2

The procedure of Example 2 was repeated except that glycidyl methacrylate prepolymer was not used. The resulting coating had poor surface gloss and the edge portion of the coating was thinner than the other portion thereof.

EXAMPLE 3

200 g Of glycidyl methacrylate monomer was dissolved in 300 g solution of glycidyl methacrylate prepolymer of Example 1 in acetone (resin content is 34%) to obtain Solution A. Prepolymer was prepared by preliminarily reacting 270 g of 2,2-bis(4-cyanatophenyl)propane, 24 g of bis(4-maleimidophenyl) methane and 6 g of mixture of 4-maleimidophenyl-3'4'-dimaleimidophenyl methane and 4-maleimidophenyl-2',4'-dimaleimidophenyl methane at 160° C. for 65 minutes. The resulting prepolymer and 200 g of novolak-type expoxy resin (ESCN 220 F produced by Sumitomo Chemical Industries, Ltd.) were dissolved in 400 g of methyl ethyl ketone to obtain Solution B. Solution A, Solution B, and 0.7 g of benzoyl peroxide and 0.1 g of zinc octoate (catalyst) were mixed together.

The resulting solution was coated on a metal surface, was cured at 100° C. for 4 hours and was further cured at 180° C. for another 10 hours. The resulting coating had a pencil hardness of 3H. The coating was immersed in each of trichrene, 10% HCl and 10% NaOH for 24 hours, and there was no observable change.

EXAMPLE 4

900 g Of 2,2-bis(4-cyanatophenyl)propane was preliminarily polymerized at 150° C. for 450 minutes. The resulting prepolymer was dissolved in a mixture of methyl ethyl ketone and N,N-dimethyl formamide. 100 g Of glycidyl methacrylate and 0.4 g of zinc octoate and 0.2 g of triethylene diamine as a catalytic composite were added to the mixture with stirring to form a uniform solution.

Glass cloth was impregnated with the varnish and dried by heating to form B-stage test pieces.

Several prepreg sheets were stacked and sandwiched between two sheets of copper foil 35μ thick. The laminate was laminate-molded at 40 Kg/cm² at 170° C. for 2 hours to completely cure the resin in the glass cloth.

The physical properties of the copper-clad laminate are shown in the following.

Peel strength of copper foil 35μ thick (Kg/cm): 2.0
Solder heat resistance at 300° C., 3 minutes: no damage
Moisture resistance at 120° C. 2 atm. in steam: no damage

EXAMPLE 5

| 2,2-bis(4-cyanatophenyl)propane | 470 g |
|---|---|
| bis(4-maleimidophenyl)methane | 100 g |
| epoxy resin (Epikote 828, Shell Oil Co.) | 30 g |
| compound having the formula | 380 g |
| 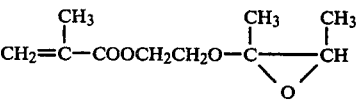 | |
| lauroyl peroxide | 0.2 g |
| methyl ethyl ketone (solvent) | |

The mixture was prepared so that the ratio of resin to solvent was 40 to 60.

Preliminary reaction was effected at 100° C. under super pressure for 2 hours with stirring. 0.07 g Of zinc octoate and 0.04 g of triethylene diamine were mixed with the prepolymer solution. The resulting solution was coated on 25 mm×125 mm×0.4 mm test pieces composed of glass cloth substrate. It was heated to form B stage product. Two test pieces were placed one on the other by facing the B staged surfaces so that their longitudinal ends overlapped by 10 mm. The B-staged product was cured at 120° C. for 11 hours, and cured at 150° C. for another 3 hours. Thickness of the overlapped portion was 2.00 mm and adhesive strength under shear thereof was 125 Kg/cm².

What is claimed is:

1. A curable resin composition consisting essentially of
   (a) at least one cyanate ester compound selected from the group consisting of:
   (1) a polyfunctional aromatic cyanate ester monomer having the formula:

$R{+}O{-}C{\equiv}N)_m$ wherein m is 2 to 5 and R is an aromatic organic group, the cyanate groups being bonded to an aromatic ring of said aromatic organic group,
   (2) a homoprepolymer of one or more polyfunction aromatic cyanate ester monomers of (1), and
   (3) a coprepolymer of (1) and an amine; and
   (b) at least one compound, said compound being selected from the group consisting of acrylic epoxy esters and methacrylic epoxy esters represented by the formula:

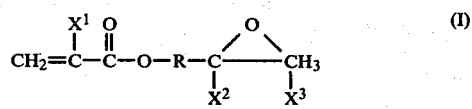

wherein $X^1$ is hydrogen or methyl, each of $X^2$ and $X^3$ is hydrogen, methyl or ethyl, or when together $X^2$ and $X^3$ represent alkylene having 3-5 carbon atoms, R is hydrocarbon or substituted hydrocarbon having 1–16 carbon atoms, homoprepolymers of one or more acrylic epoxy esters, homoprepolymers of one or more methacrylic epoxy esters, coprepolymers of acrylic epoxy esters and methacrylic epoxy esters and mixtures thereof; said composition including a mixture of components (a) and (b), a preliminary reaction product of components (a) and (b), or the combination of said mixture and said preliminary reaction product.

2. The composition as defined in claim 1 wherein the cyanate ester is selected from the group consisting of 1,3-, 1,4-dicyanatobenzene; 1,3,5-tricyanatobenzene, 1,3-, 1,4-, 1,6-, 1,8-, 2,6- or 2,7-dicyanatonaphthalene; 1,3,6-tricyanatonaphthalene; 4,4'-dicyanatobiphenyl; bis(4-tricyanatonaphthalene; 4,4'-dicyanatobiphenyl; bis(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl) ether; bis(4-cyanatophenyl)thioether; bis(4-cyanatophenyl) sulfone; tris(4-cyanatophenyl)phosphite; tris(4-cyanatophenyl) phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

3. The composition as defined in claim 1 wherein R group in the compound represented by the above formula I is —$CH_2$—, —CH=CH—, —$CH_2CH(CH_3)$—, —$(CH_2)_4$—$CH(CH_2)$—, —$(CH_2)_6$—$CH(CH_3)$—, —$(CH_2)_{10}$—$CH(CH_3)$—,

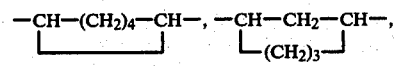

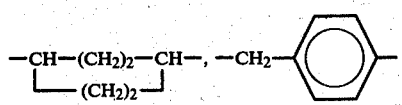

or —$(CHY^1CHY^2O)_p$— wherein both of $Y^1$ and $Y^2$ are hydrogen, or one of $Y^1$ or $Y^2$ is hydrogen and the other is methyl, and p is integer of 1–7.

4. The composition as defined in claim 1 wherein the ratio by weight of component (a) to component (b) is in the range of from 99:1 to 1:99.

5. A curable resin composition consisting essentially of:
(a) at least one cyanate ester compound selected from the group consisting of:
(1) a polyfunctional aromatic cyanate ester monomer having the formula:

R—$(O$—$C$≡$N)_m$ wherein m is 2 to 5 and R is an aromatic organic group, the cyanate groups being bonded to an aromatic ring of said aromatic organic group,
(2) a homoprepolymer of one or more polyfunction aromatic cyanate ester monomers of (1), and
(3) a coprepolymer of (1) and an amine;
(b) at least one compound, said compound being selected from the group consisting of acrylic epoxy esters and methacrylic epoxy esters represented by the formula:

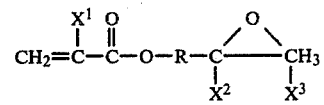

wherein $X^1$ is hydrogen or methyl, each of $X^2$ and $X^3$ is hydrogen, methyl or ethyl, or when together $X^2$ and $X^3$ represent alkylene having 3–5 carbon atoms, R is hydrocarbon or substituted hydrocarbon having 1–16 carbon atoms, homoprepolymers of one or more acrylic epoxy esters, homoprepolymers of one or more methacrylic epoxy esters, coprepolymers of acrylic epoxy esters and methacrylic epoxy esters and mixtures thereof; and
(c) at least one compound selected from the group consisting of:
(1) a polyfunctional maleimide,
(2) a homoprepolymer of one or more polyfunctional maleimides of (1), and
(3) a coprepolymer of (1) and an amine;
said composition including a mixture of components (a), (b) and (c), a preliminary reaction product of components (a), (b) and (c), the combination of said mixture and said preliminary reaction product, the combination (a) and the preliminary reaction product of (b) and (c), the combination of (b) and the preliminary reaction product of (a) and (c), or the combination of (c) and the preliminary reaction product of (a) and (b).

6. The composition as defined in claim 5 wherein the cyanate esters is selected from the group consisting of 1,3-, 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis-(4-cyanatophenyl)methane; 2,2-bis(4-cyanatophenyl)propane; 2,2-bis(3,5-dichloro-4-cyanatophenyl)propane; 2,2-bis(3,5-dibromo-4-dicyanatophenyl)propane; bis(4-cyanatophenyl) ether; bis(4-cyanatophenyl)thioether; bis(4-cyanatophenyl) sulfone; tris(4-cyanatophenyl)phosphite; tris(4-cyanatophenyl) phosphate; bis(3-chloro-4-cyanatophenyl)methane; cyanated novolak produced by reacting a novolak with cyanogen halide; cyanated bisphenol polycarbonate oligomer produced by reacting a bisphenol polycarbonate oligomer with cyanogen halide; and mixtures thereof.

7. The composition as defined in claim 5 wherein R group in the compound represented by the above formula I is —$CH_2$—, —CH=CH—, —$CH_2CH(CH_3)$—, —$(CH_2)_4$—$CH(CH_2)$—, —$(CH_2)_6$—$CH(CH_3)$—, —$(CH_2)_{10}$—$CH(CH_3)$—,

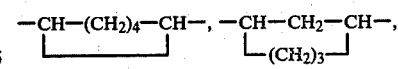

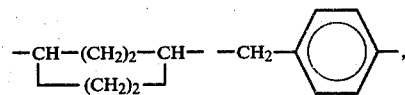

or —$(CHY^1CHY^2O)_p$— wherein both of $Y^1$ and $Y^2$ are hydrogen, or one of $Y^1$ or $Y^2$ is hydrogen and the other is methyl, and p is integer of 1–7.

8. The composition as defined in claim 5 wherein the ratio by weight of component (a) and component (b) is in the range of from 99:1 to 1:99.

* * * * *